United States Patent
Marshall et al.

(10) Patent No.: US 9,434,547 B2
(45) Date of Patent: Sep. 6, 2016

(54) ARTICLE DIVERTING CONVEYOR BELT

(71) Applicant: Laitram, L.L.C., Harahan, LA (US)

(72) Inventors: Angela Longo Marshall, Harahan, LA (US); Mark Costanzo, River Ridge, LA (US); Jason Greenleaf, Mandeville, LA (US); David Herbert Myers, River Ridge, LA (US); Matthew John Greer, Mandeville, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/645,986

(22) Filed: Mar. 12, 2015

(65) Prior Publication Data

US 2015/0259146 A1    Sep. 17, 2015

Related U.S. Application Data

(60) Provisional application No. 61/952,425, filed on Mar. 13, 2014.

(51) Int. Cl.
| | |
|---|---|
| *B65G 47/26* | (2006.01) |
| *B65G 17/34* | (2006.01) |
| *B65G 17/08* | (2006.01) |
| *B65G 47/96* | (2006.01) |

(52) U.S. Cl.
CPC .............. *B65G 17/345* (2013.01); *B65G 17/08* (2013.01); *B65G 47/96* (2013.01)

(58) Field of Classification Search
CPC .................................................. B65G 17/345
USPC .............. 198/370.06, 457.03, 816, 842, 853
See application file for complete search history.

(56) References Cited

U.S. PATENT DOCUMENTS

| | | | |
|---|---|---|---|
| 4,096,936 A | 6/1978 | Nielsen | |
| 4,225,036 A * | 9/1980 | Michael | B65G 15/46 198/840 |
| 6,669,012 B1 | 12/2003 | Yoshida et al. | |
| 6,705,452 B2 | 3/2004 | Greve et al. | |
| 6,802,412 B2 * | 10/2004 | Lapeyre | B65G 47/844 198/370.02 |
| 6,948,613 B2 * | 9/2005 | Guldenfels | B65G 17/08 198/688.1 |
| 7,080,725 B2 | 7/2006 | Hishinuma | |
| 7,506,751 B2 * | 3/2009 | Fourney | B65G 47/34 198/370.09 |
| 7,802,674 B1 * | 9/2010 | McGuire | B65G 23/44 198/816 |
| 8,167,118 B2 | 5/2012 | Fourney | |
| 8,225,922 B1 | 7/2012 | Fourney | |
| 8,646,596 B2 | 2/2014 | Andersen | |
| 2001/0042677 A1 | 11/2001 | Palmaer | |
| 2003/0221932 A1 | 12/2003 | Costanzo | |
| 2003/0221935 A1 | 12/2003 | Barklin et al. | |
| 2010/0078297 A1 | 4/2010 | Andersen | |

OTHER PUBLICATIONS

International Search Report and Written Opinion of the International Searching Authority, PCT/US2015/020163, mailed Jun. 19, 2015, Korean Intellectual Property Office, Republic of Korea.

* cited by examiner

*Primary Examiner* — William R Harp
(74) *Attorney, Agent, or Firm* — Catherine M. Bishop

(57) ABSTRACT

An article-diverting modular conveyor belt employs an article mover on a conveyor belt module for selectively moving a conveyed article towards a side of the module. The article mover may be a transversely-extending endless belt for carrying articles across the belt towards a side of the module. Rollers below the conveyor belt are selectively activated to induce movement of the article mover.

13 Claims, 18 Drawing Sheets

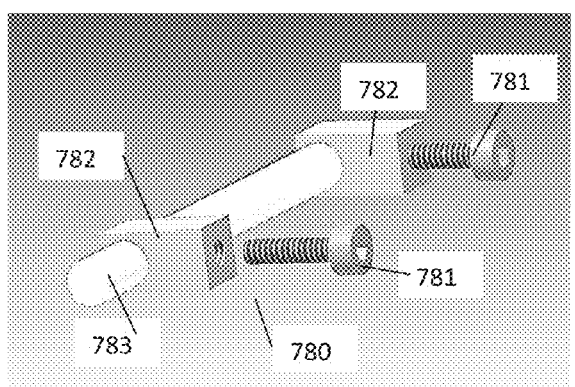
FIG. 22
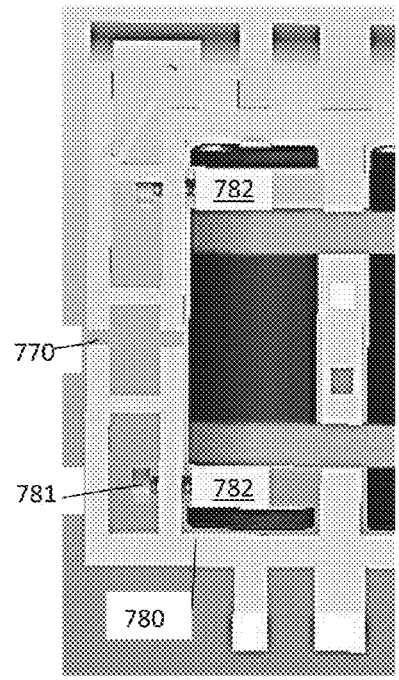
FIG. 23
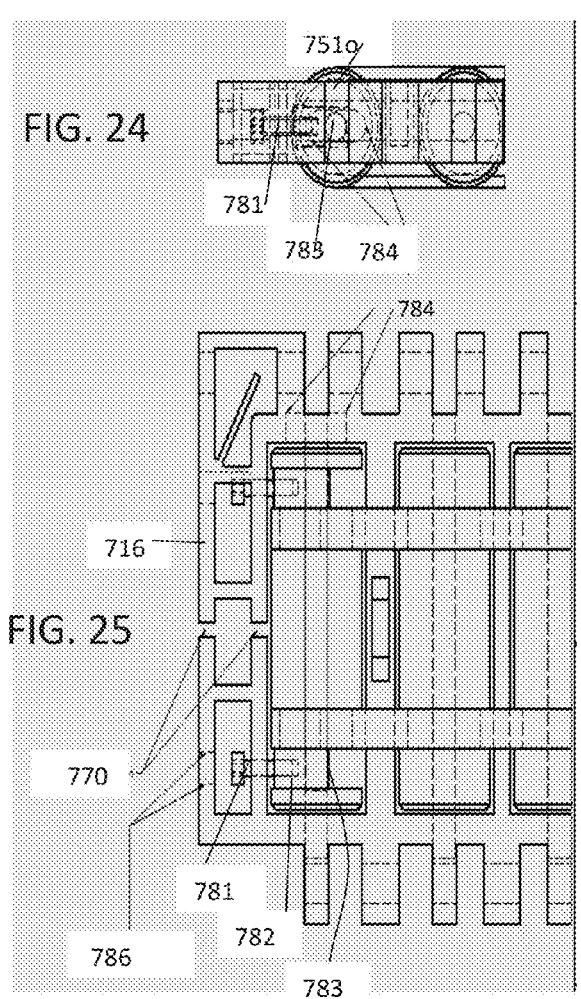
FIG. 24
FIG. 25

ARTICLE DIVERTING CONVEYOR BELT

RELATED APPLICATIONS

The present application claims priority to U.S. Provisional Patent Application No. 61/952,425, filed Mar. 13, 2014 and entitled "Article Diverting Conveyor Belt", the contents of which are herein incorporated by reference.

BACKGROUND

The invention relates generally to power-driven conveyors and more particularly to conveyors including article-diverting devices for transporting articles in a selected direction.

Some conveying applications require that selected articles being conveyed along a main conveying path be diverted off the main path and conveyed away in another direction, while the rest of the articles continue to advance along the main path. But article-diverting devices tend to have a lot of moving parts, which can be difficult to clean and not practical for use in food-handling and other sanitary applications. In addition, many article-diverting devices employ rollers, which present an unsteady surface for products.

SUMMARY

An article-diverting conveyor belt embodying features of the invention comprises a plurality of modules hingedly connected together. At least one module includes a transverse endless belt for carrying articles across the module towards a side of the module. Rollers below the module are selectively oriented to induce movement of the endless belt towards a side of the module to selectively divert a product conveyed on the module.

According to one aspect, a conveyor comprises a first conveyor belt module having a body extending in length from a first end to a second end and in width from a left side to a right side and having a top side and an opposite bottom side, an article mover extending transversely relative to the top side of the body, a second conveyor belt module hingedly connected to the first conveyor belt module and an array of activation rollers disposed below the conveyor belt modules for selectively activating the article mover.

According to another aspect, a conveyor belt module comprises a body extending in length from a forward end to a rearward end and in width from a first side edge to a second side edge and in thickness from a top side to an opposite bottom side, a plurality of hinge elements extending from the forward end and the rearward end, and an endless belt arranged to move transversely relative to the body. The endless belt has a top surface that is substantially flush with the top side of the body.

According to another aspect, a conveyor belt module comprises a body extending in length from a forward end to a rearward end and in width from a first side edge to a second side edge and in thickness from a top side to an opposite bottom side, a plurality of hinge elements extending from the forward end and the rearward end and a modular plastic conveyor belt arranged to move transversely relative to the body. The modular plastic conveyor belt comprises a plurality of hingedly connected modules.

According to another aspect, a conveyor belt module comprises an upper conveying surface having a groove, a transverse endless conveyor belt seated in the groove and flush with the upper conveying surface in an upper span, a first set of hinge elements extending along a front end of the module and a second set of hinge elements extending along a rear end of the module.

BRIEF DESCRIPTION OF THE DRAWINGS

These features of the invention, as well as other aspects and advantages, are described in more detail in the following description, appended claims, and accompanying drawings, in which:

FIG. 22 is an exploded view of a tensioning device suitable for use with the module of FIGS. 20A and 20B;

FIG. 23 is a top detailed view of a side of an edge portion of the module of FIGS. 20A and 20B showing the assembled tensioning device;

FIG. 24 is a side view of the portion of FIG. 23;

FIG. 25 is a top cross-sectional view of the portion of FIG. 23;

DETAILED DESCRIPTION

A conveyor belt employs a transverse endless belt on a module to provide a flat, even diverting surface for moving products relative to the direction of conveyance. The invention will be described below relative to certain illustrative embodiments, though those skilled in the art will recognize that the invention is not limited to the illustrative embodiments.

Figure 1:
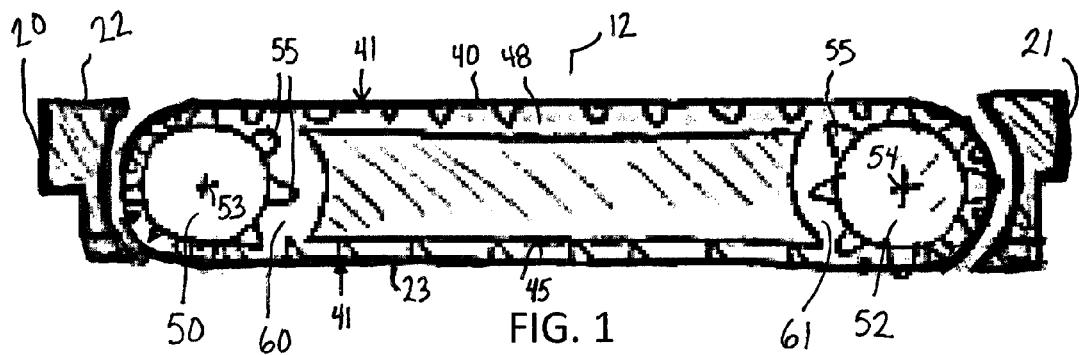
FIG. 1 is a cross-sectional view of a conveyor belt module including a transverse endless belt according to one embodiment of the invention.
Figure 2A:
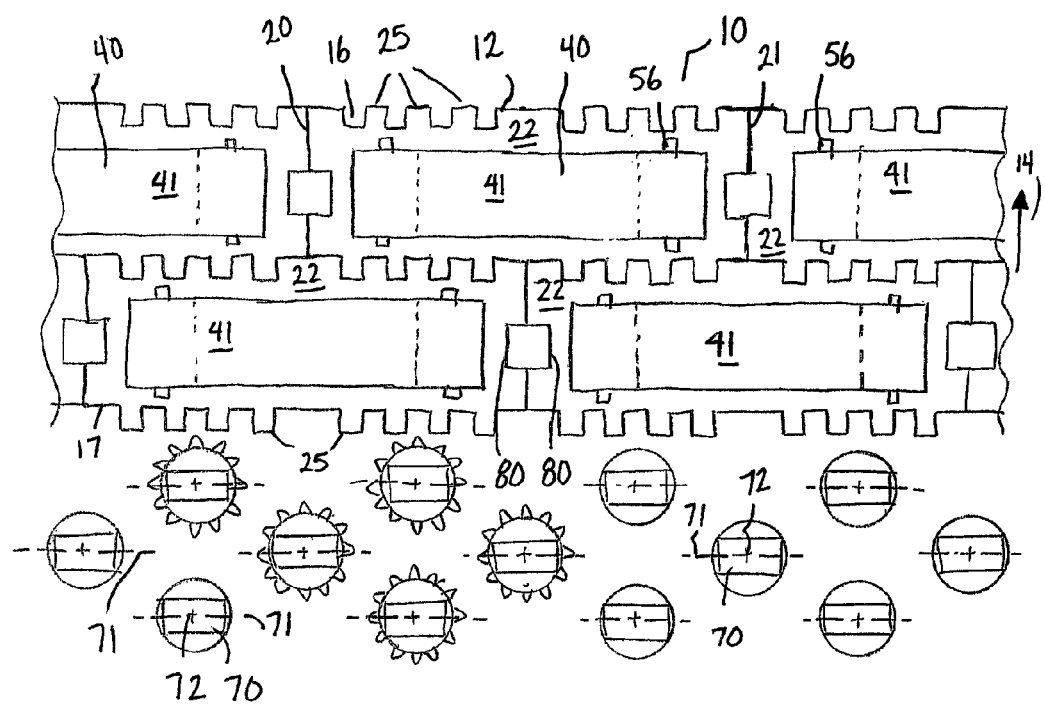
FIG. 2A is a top view of a portion of a conveyor belt including the conveyor belt module of FIG. 1 with activation rollers in an in-line position.
Figure 2B:
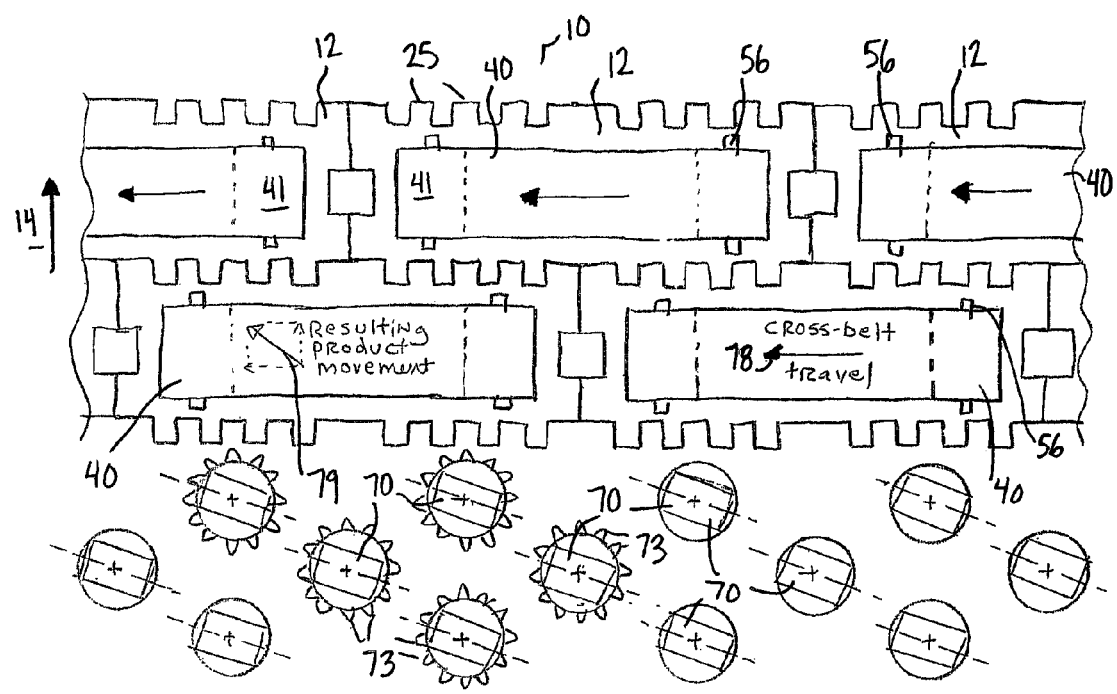
FIG. 2B is a top view of the conveyor belt portion of FIG. 2A with the activation rollers in an angled position for engaging and moving the endless belts.

FIG. 1 is a side view of a conveyor belt module 12 usable as an article diverter embodying features of the invention. A plurality of conveyor belt modules 12 may be joined together to form a conveyor belt, a portion of which is shown in FIGS. 2A and 2B. The conveyor belt 10 is constructed of a series of conveyor belt modules 12 arranged in rows. The modules are shown offset laterally from row to row in a bricklay pattern though the invention is not so limited.

Each conveyor module 12 has a central body extending in length from a forward end 16 to a rearward end 17 in a conveying direction 14, i.e., a direction of belt travel. The central body of each module 12 extends in width from a left side 20 to a right side 21 and in thickness from a top conveying surface 22 to an opposite bottom surface 23. The bottom surface 23 may have drive elements for driving the conveyor belt using a sprocket or other suitable driver. The module further includes hinge elements 25 spaced apart along the forward and rearward ends 16, 17 of the central body. The hinge elements 25 are interconnected, by hinge pins, for example, at hinge joints between adjacent rows. The invention may be applicable to other types of conveyors, and is not limited to modular plastic conveyor belts. For example, instead of a modular hinged belt, a slat conveyor belt constructed of slat modules between flanking roller chains could be used.

Each module 12 further includes an article mover for pushing products transversely, such as towards the left side 20 or right side 21 of the module. The article mover shown in FIGS. 1-2 comprises a transverse endless belt 40 trained around two wheels, illustrated as sprockets 50, 52. Alternatively, the module may include pulleys, nose bars or other suitable structure for transitioning the transverse endless belt between the top of the module and the bottom of the module.

The module body includes a channel 48 in the top conveying surface 22, and optionally the bottom surface 23, for receiving the transverse endless belt 40.

The module body includes pockets 60, 61 for rotatably mounting the sprockets 50, 52. The sprockets include teeth 55 for engaging drive elements 44 on the inner surface 45 of the transverse belt 40. The illustrative sprockets 50, 52 are mounted off center within or relative to the module body, such that the outer surface 41 is substantially flush with the top surface 22 of the module in the upper span. (The sprocket centers 53, 54 are closer to the bottom surface 23 of the module body than the top surface 22.) The sprockets are mounted on and rotate about axles 56, which extend into the module body. In the lower span of the endless belt 40, the outer surface 41 extends outwards from the bottom surface 23 of the module.

The transverse endless belt 40 may have any suitable size, shape and configuration. Preferably, the endless belt 40 forms a majority of the conveying surface of the module 12, extending almost to the hinge elements 25 and sides 20, 21 of the module. The illustrative endless belt 40 is a modular plastic belt, for example, a mini-pitch Series 550 straight belt available from Intralox, LLC of Harahan, La. Alternatively, the endless belt may be a timing belt or thermoplastic, directly drive belt, such as the Thermodrive® belt available from Intralox, LLC. The transverse endless belt 40 may comprise a high-friction material on the outer surface 41 to minimize slippage of products on the belt. The inner surface 45 of the transverse endless belt 40 may have a low-friction material to facilitate movement of the endless belt relative to the module body. Other means of reducing friction between the module body and endless belt 40 may be used, such as rollers in the carryway or other suitable means.

As shown in FIGS. 2A and 2B, a plurality of modules 12 may be bricklaid together to form a conveyor belt 10. An activator is disposed below the belt for selectively moving an endless belt 40 in a transverse direction relative to the associated module body. The illustrative activator comprises an array of activation rollers 70 disposed below the belt 10. Each activation roller 70 is freely rotatable about a first axis 71. Each activation roller 70 is also selectively pivotable about a second axis 72 that is perpendicular to the first axis 71 and extends through the center of each activation roller 70. The rollers selectively pivot about the second axis 72 to orient the rollers. The activation rollers engage the transverse endless belt 40 in the bottom span to selectively drive the transverse endless belt.

For example, when the activation rollers are oriented inline with the conveyor belt, as shown in FIG. 2A, the transverse endless belt is not driven and remains static. The product carried by the modules 12 moves forward with the conveyor belt 10. When the activation rollers are orientated at an angle, as shown in FIG. 2B, the activation rollers 70 engage the transverse endless belt 40 to induce movement. The angled activation rollers 70 move the transverse endless belt 40 to divert product to the side of the engaged module, as shown by arrow 78. Arrow 79 is a vector showing the resulting product movement of product from the combination of the forward movement of the main belt 10 in the direction of arrow 14, and the transverse movement of the endless belt 40 in the direction of arrow 78.

In one embodiment, the activation rollers 70 may be oriented in any number of orientations to enable bi-directional diverting and-or diverting at different speeds. The activation rollers 70 may include gear teeth 73 in a housing or another suitable structure for engaging an orientation tool, such as a rack gear. Any suitable means for selectively orienting the activation rollers 70 to induce movement of the endless belt 40 may be used.

The conveyor belt 10 may include additional rollers extending from the top surface of the belt. As shown, the modules have side recesses 80 that form a pocket for accommodating a transition roller. The transition roller facilitates transfer of product between adjacent modules 12.

The invention provides a flat conveying surface formed by the surfaces 22 and 41 to provide stability for conveyed products. The flat conveying surface prevents bouncing of the product and consistent, increased contact area with the product.

The module body 12 may be split into segments, if desired. In addition, the module body 12 may include hold-downs for the transverse endless belt to help contain the transverse endless belt in the channel 48. The channel 48 may have a flat bottom surface, which could be the same as or different than the rest of the module body, or the channel 48 may include rollers to form a roller carryway for the transverse endless belt to reduce friction.

Figure 3:
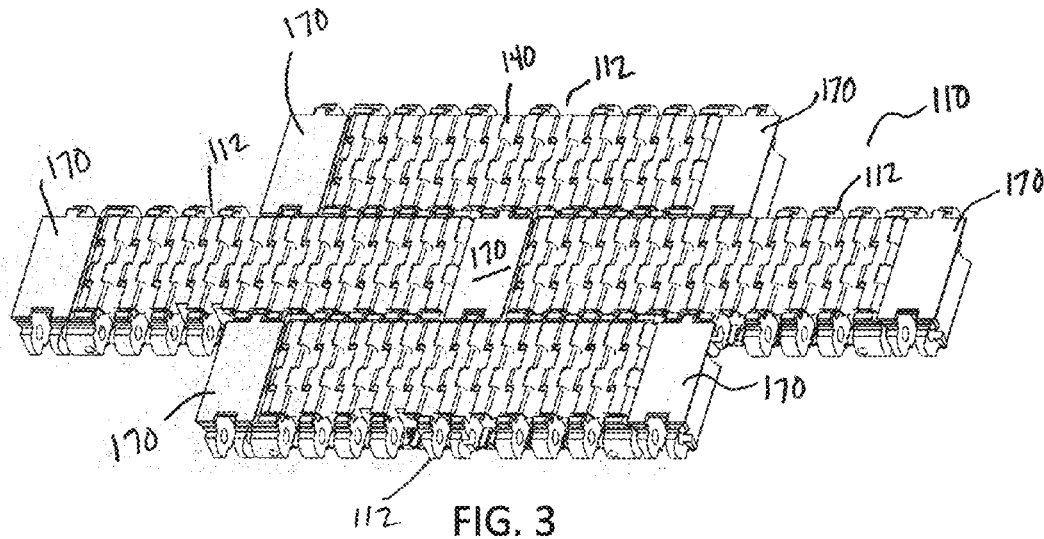
FIG. 3 is an isometric top view of a portion of a conveyor belt including a plurality of modules having transverse endless belts according to another embodiment of the invention.
Figure 4:
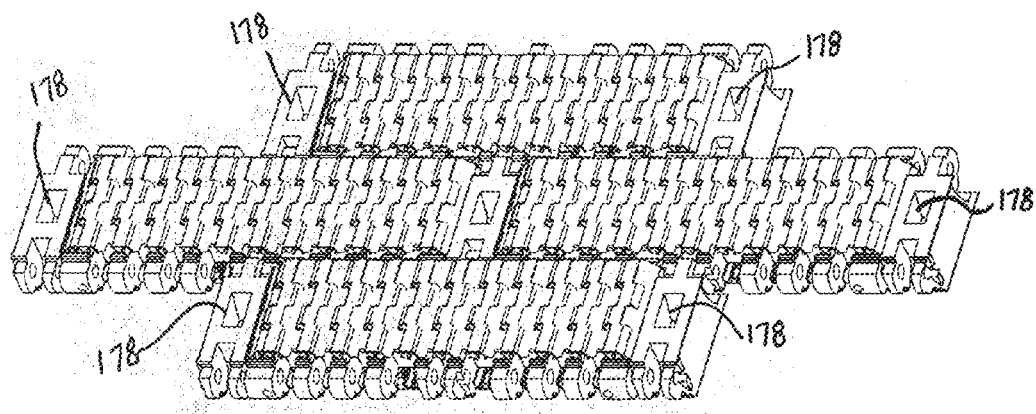
FIG. 4 is an isometric bottom view of the conveyor belt portion of FIG. 3.
Figure 5:
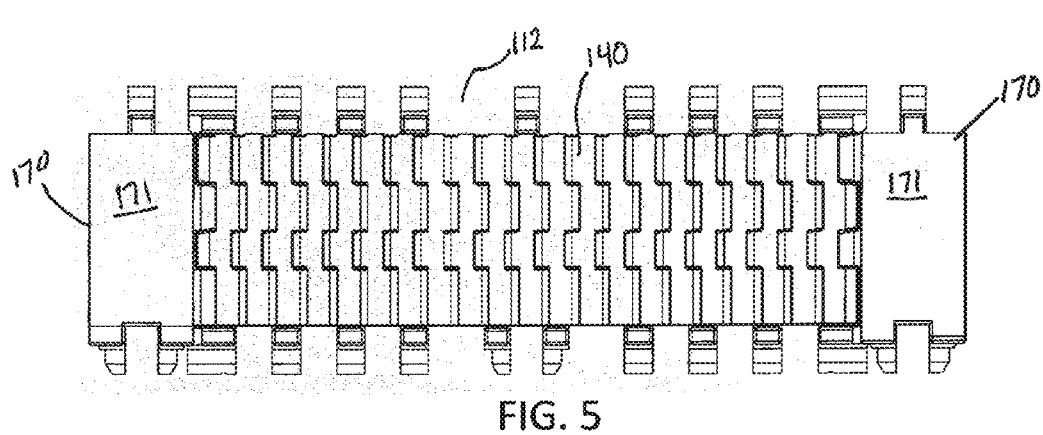
FIG. 5 is a top view of a conveyor belt module including a transverse endless belt of the conveyor belt portion shown in FIG. 3.
Figure 6:
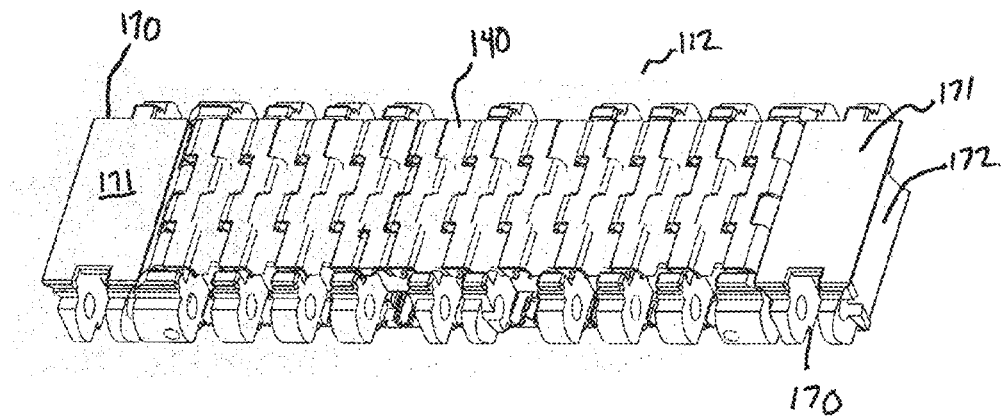
FIG. 6 is an isometric view of the conveyor belt module of FIG. 5.

FIGS. 3-4 shows another embodiment of a conveyor belt 110 comprising a plurality of conveyor belt modules 112. The illustrative conveyor belt 110 comprises a plurality of modules 112 arranged in a bricklay pattern though the invention is not so limited. At least one conveyor belt module includes a transverse endless belt 140 trained around sprockets for selectively moving conveyed product towards one side of the module, as shown in FIGS. 3-7. The conveyor belt modules 112 also include end caps 170 at each side, as described below. In one embodiment, the end caps 170 include pockets or openings 178 in the bottom surface forming drive structure for the belt, though the invention is not so limited.

The illustrative transverse endless belt 140 is a modular plastic belt, for example, a mini-pitch Series 550 straight belt available from Intralox, LLC of Harahan, La. The transverse endless belt 140 comprises a plurality of relatively small plastic modules hinged together. The illustrative endless belt 140 has a width that is about two inches, and the module 112 has a pitch of about 2.25 inches, so that the endless belt 140 forms most of the overall conveying surface of the module.

Figure 8:
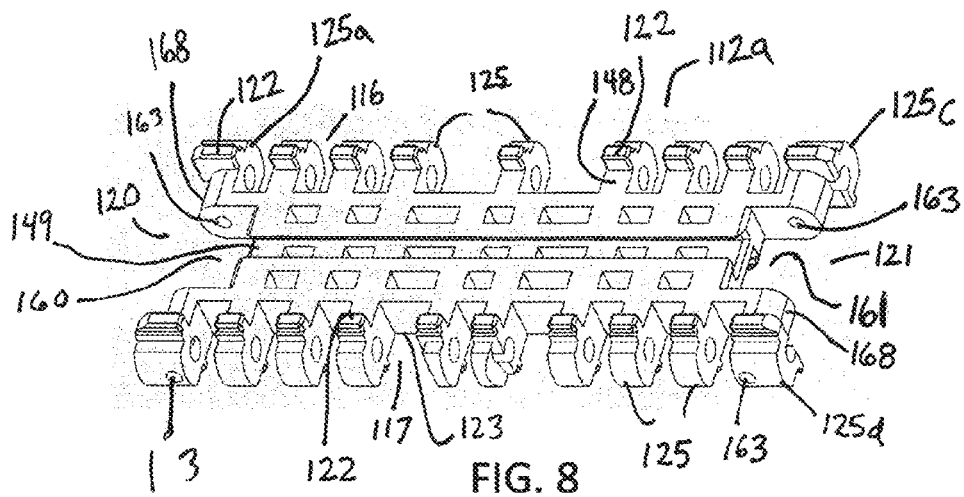
FIG. 8 shows the conveyor belt module of FIG. 5 with the transverse endless belt, end caps and sprockets removed.

Referring to FIG. 8, which shows a conveyor belt module 112 without the transverse endless belt, the module 112 includes a central body 112*a* extending in length from a forward end 116 to a rearward end 117, from a left side 120 to a right side 121 and from a top conveying surface 122 to an opposite bottom surface 123. The module further includes hinge elements 125 spaced apart along the forward and rearward ends of the central body.

The central body further includes pockets 160, 161 for mounting sprockets 150, 152 (shown in FIG. 9), other wheels, pulleys or reversing structure formed in the left and right side edges. The pockets 160, 161 include openings 163 for receiving axles to mount the sprockets or wheels. Each pocket 160, 161 is preferably formed between two outer hinge elements 125*a* and 125*b*, or 125*c* and 125*d*. The axle-receiving opening 163 may extend through the hinge elements.

The central body further defines a channel 148 for receiving the transverse endless belt 140. The channel receives the transverse endless belt 140 such that the top outer surface of the transverse endless belt is flush or substantially flush with the upper conveying surface 122. The outer surface of the transverse endless belt 140 preferably protrudes from the bottom surface 123 of the central body in the lower span.

Figure 7:
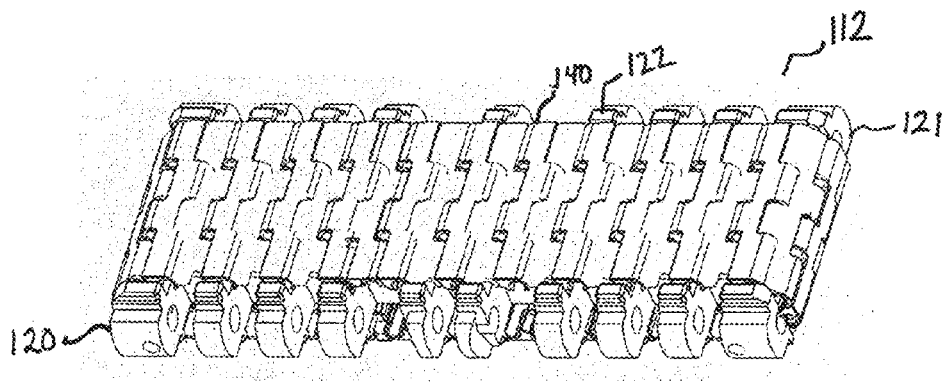
FIG. 7 is an isometric view of the conveyor belt module of FIG. 5 with the end caps removed.
Figure 9:
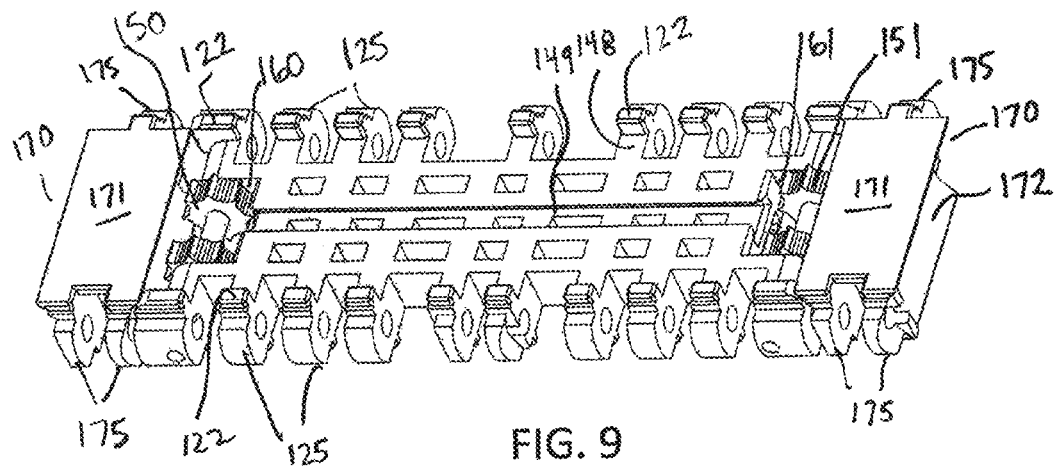
FIG. 9 shows the conveyor belt module of FIG. 5 with the transverse endless belt removed.

The channel 148 continues at the side edges of the module body, forming rounded surfaces 168 for guiding the transverse endless belt 140 between the upper and lower spans. The rounded surfaces are formed on each side of a sprocket or set of sprockets 150, 152, as shown in FIG. 9. As shown in FIG. 7, the endless belt 140 spans the module body, wrapping around the side edges 120, 121.

The illustrative module further includes a secondary channel 149 within the channel 148 for accommodating the shape of the illustrative transverse endless belt 140.

As shown in FIGS. 3, 4 and 6-9, the upper surface 122 of the module body is higher than the top of the hinges 125. When adjacent modules interlace to form the conveyor belt, the upper surfaces 122 of the modules form a continuous surface that is preferably flush with the upper surface of the transverse endless belt 140.

As shown in FIG. 9, the module includes a sprocket assembly 150, 152 mounted in each pocket 160, 161. The sprocket assembly comprises two sprockets mounted on or integral with an axle. The sprockets have teeth or other suitable structure for engaging drive structure on the transverse endless belt 140.

The illustrative conveyor belt 110 further includes end caps 170 for the modules 112. Each end cap 170 includes an upper surface 171 that is substantially flush with the upper surface of the module 122 and the outer surface of the transverse endless belt 140. Each end cap 170 includes curved side surfaces 172 to allow the end cap to cover the sprocket and reversing side of the transverse endless belt. The bottom of the end caps includes pockets 178 and may be inset from the transverse endless belt 140. Each end cap 170 also includes hinge elements 175 configured to align with the hinge elements 125 on the module body. The end cap hinge elements 175 receive a hinge rod extending through the module hinge elements 125 to secure the end cap to the module body. Alternatively, the module body may include a component that fills a gap between transverse adjacent belts on adjacent modules, and the invention is not limited to including the illustrative end caps 170.

Figure 10:
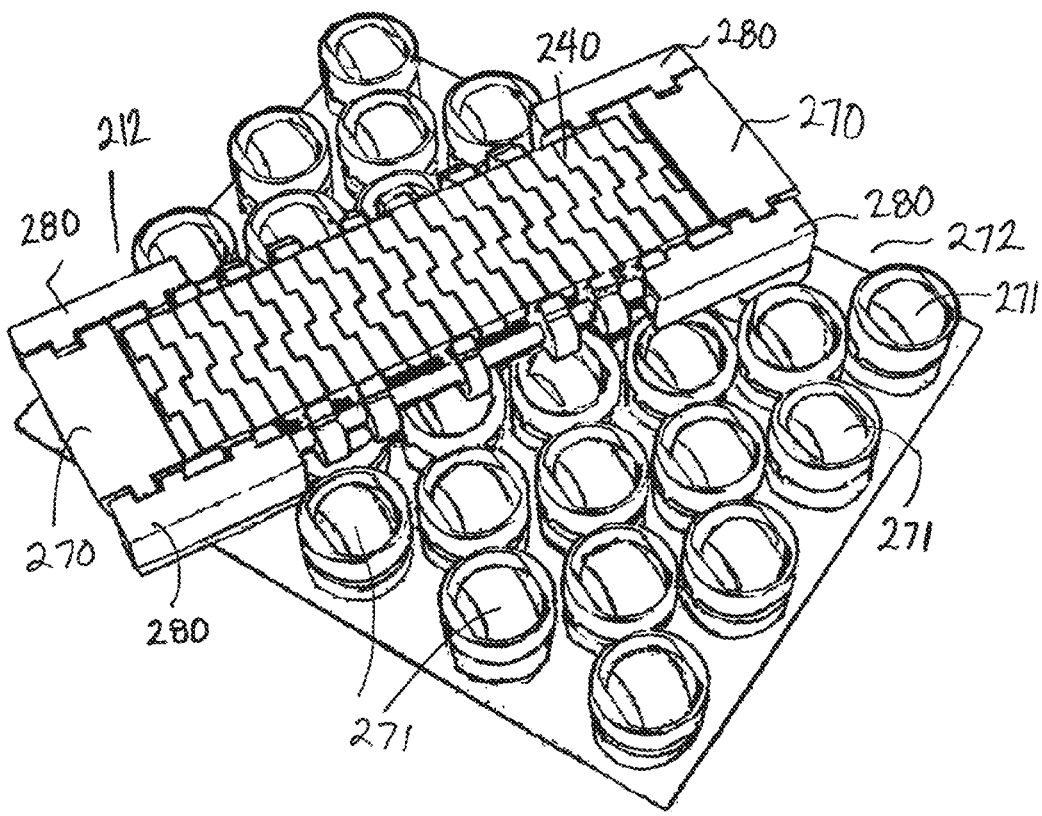
FIG. 10 shows another embodiment of a conveyor belt module with a transverse endless belt and an underlying array of activation rollers

FIG. 10 shows a conveyor belt module 212 disposed over a carryway 272 formed of an array of activation rollers 271. The module 212 includes a transverse endless belt 240, end caps 270 and side caps 280 for securing the end caps to the module body. The activation rollers 271 may be selectively pivoted relative to the mounting structure to activate the transverse endless belt 240. As the conveyor belt moves over the carryway rollers 271, the rollers spin. The spinning rollers 271 contact the transverse belt 240 to cause the belt to move towards one side of the module 212 or the other.

Figure 11A:
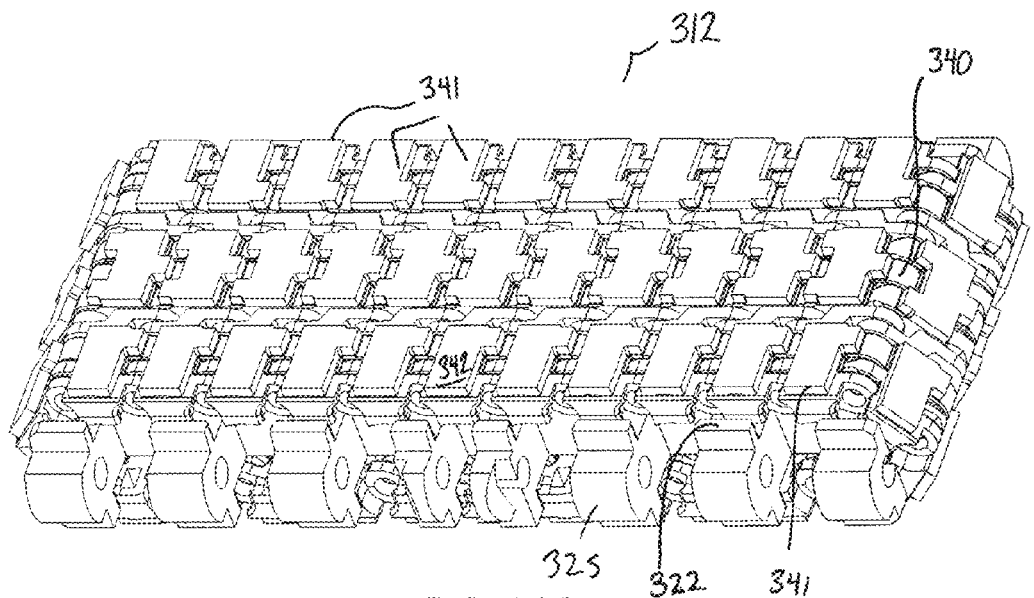
FIG. 11A is an isometric view of a conveyor belt module with a transverse endless belt and rollers in the body of the conveyor belt module to decrease friction during movement of the transverse endless belt.
Figure 11B:
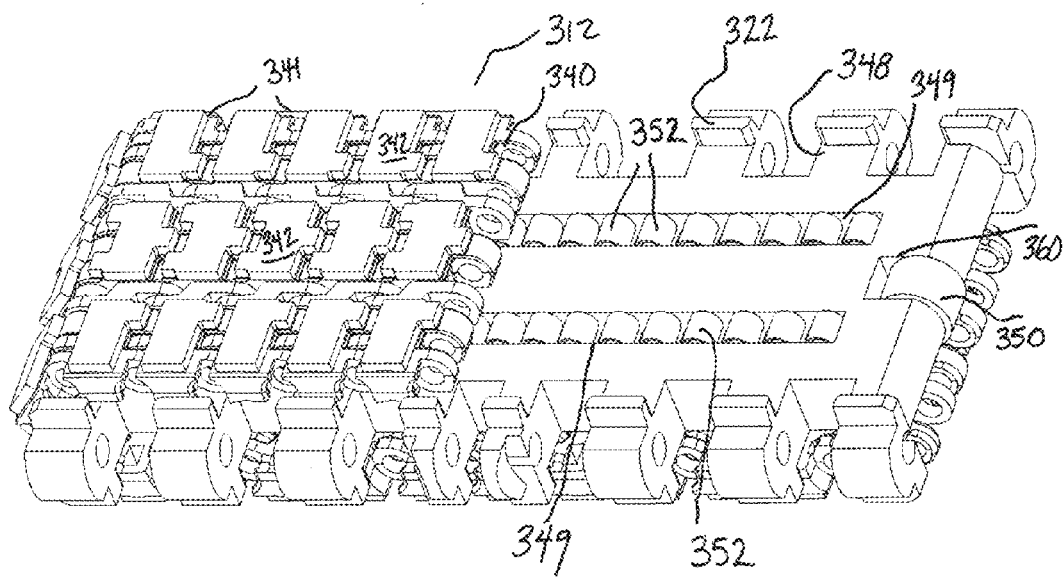
FIG. 11B shows the conveyor belt module of FIG. 11A with a portion of the transverse endless belt cutaway to show the rollers in the body of the conveyor belt module.

FIGS. 11A and 11B show another embodiment of a conveyor belt module 312 having an article mover, illustrated as a transverse endless belt 340, for pushing products transversely. The illustrative transverse endless belt 340 comprises a number of hingedly connected modules 341, with multiple modules per row. The module 312 includes a central body having a top conveying surface 322 and a central transverse channel 348 in the top surface 322. The transverse endless belt 340 is seated in the central transverse channel 348 and extends to almost the hinge elements 325. The hinge elements 325 extend in a direction of belt travel from the forward and rearward ends of the central module body.

The module further includes guiding elements 350, shown as rollers, on each side edge of the module body for guiding the transverse endless belt 340 from the top side of the module body to the bottom side of the module body. The guiding elements are mounted in pockets 360, as described above.

The module 312 further includes transverse subchannels 349 within the channel 348. Each subchannel 349 includes a series of free-spinning rollers 352 to form a reduced-friction carryway in the channel 348 for the transverse endless belt 340.

The illustrative transverse endless belt modules 341 include rubber overmolds 342 to form the trasverse transport surface, though the invention is not so limited.

Figure 12:
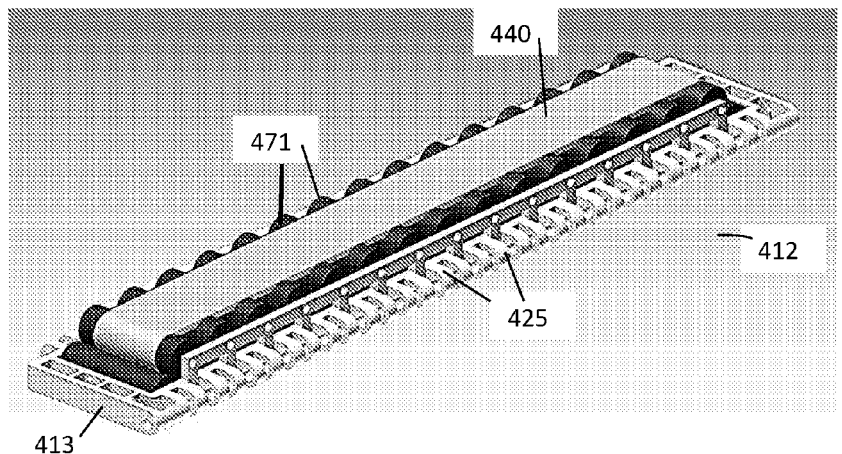
FIG. 12 is an isometric view of a conveyor belt module having a transverse conveyor belt trained over rollers to form a transverse conveying surface according to another embodiment of the invention.
Figure 13:
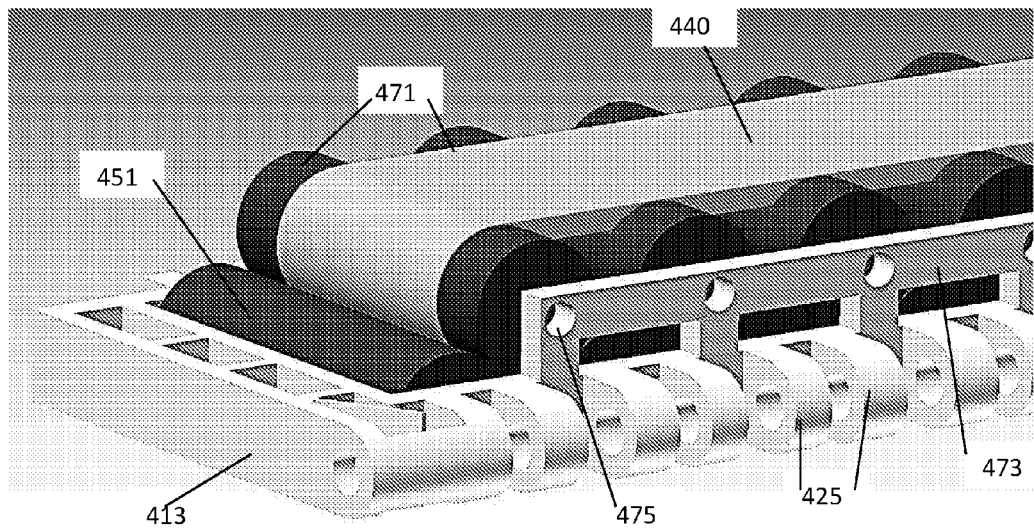
FIG. 13 is a close of view of an edge portion of the module of FIG. 12.
Figure 14:
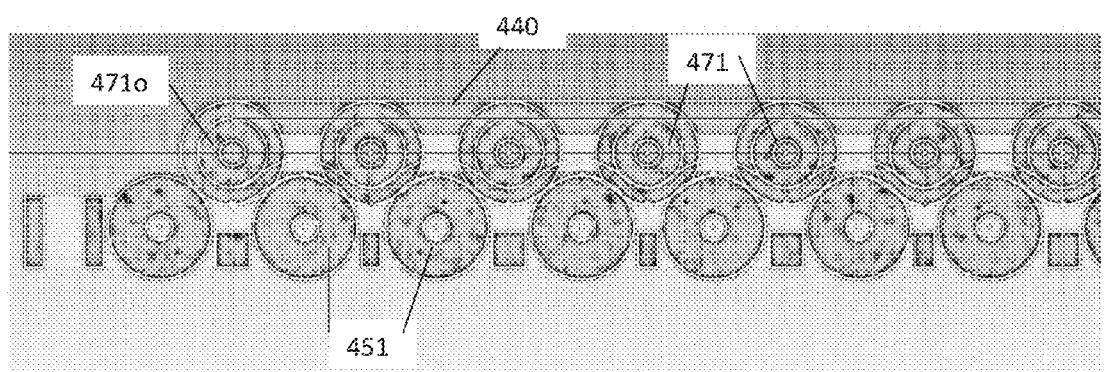
FIG. 14 is a cross-sectional side view of the module of FIG. 12.

FIGS. 12-14 show another embodiment of a conveyor belt module 412 having a transverse conveyor belt 440 forming a transverse conveying surface. The illustrative transverse conveyor belt is a flat belt, though the invention is not so limited. The illustrative conveyor belt module 412 includes a base module 413, which comprises a hinged module body having a series of transverse bottom rollers 451 that spin about axes that extend in the direction of belt travel. The base module 413 may be similar to the S7000 belt module available from Intralox, L.L.C. of Harahan, La. The base module 413 includes hinge elements 425. The module 412 of FIGS. 12-14 further includes a series of transverse upper rollers 471 about which a transverse conveyor belt 440 is trained. The illustrative upper rollers 471 are located in spaces between each bottom roller, as shown in FIG. 14.

The conveyor belt module 412 includes transverse rails 473 for mounting the upper rollers 471 in place. The transverse rails 473 are connected to the body of the module 412 and include axle openings 475 for receiving the axles of the upper rollers 471 to allow the upper rollers to rotate.

While the illustrative embodiment shows the upper row of rollers completely filled with the upper rollers 471, alternatively, the upper row can be only partially filled with the upper rollers. The upper rollers can have a different diameter from the transverse bottom rollers 451.

In the illustrative embodiment, the upper rollers 471 have grooves cut into them to receive the transverse conveyor belt 440. The grooves allow the outer surface of the transverse conveyor belt 440 to be flush with the outer surfaces of the upper rollers 471. The illustrative conveyor belt 440 occupies a substantial portion of the conveying surface formed by the module 412.

As shown in FIG. 14, the transverse conveyor belt 340 forms a transport surface on its top span, wraps around the outermost upper rollers 471o and snakes between the bottom rollers 451 and upper rollers 471 in the lower span. When the bottom rollers 451 are activated, the spinning of the bottom rollers 451 induced rotation of the top rollers 471, causing the transverse conveyor belt 440 to move to one side of the conveyor belt module 412 or the other.

The bottom rollers 451 can be activated by an array of free-spinning rollers that are orientable to change the direction of rotation of the bottom rollers 451, as described above.

Figure 15:
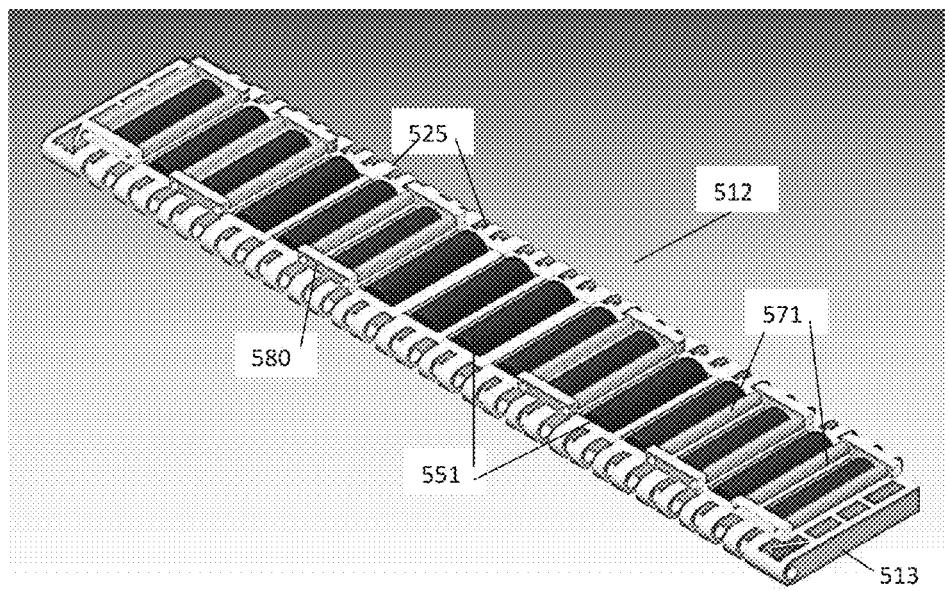
FIG. 15 is an isometric view of a conveyor belt module suitable for mounting a transverse conveyor belt using small upper rollers.
Figure 16:
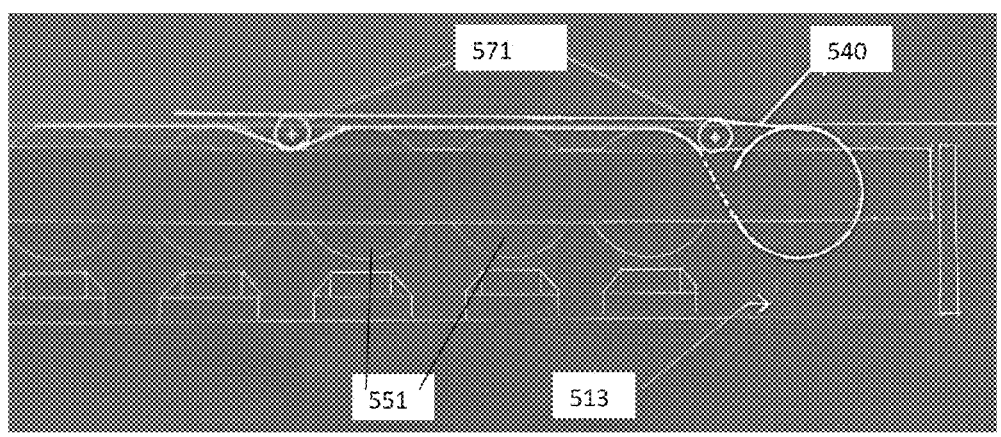
FIG. 16 is a cross-sectional side view of a portion of the module of FIG. 15.

FIGS. 15 and 16 show another embodiment of a conveyor belt module 512 having a double layer of rollers and a transverse conveyor belt 540. The illustrative conveyor belt module 512 includes a base module 513, which comprises a hinged module body having a series of transverse bottom rollers 551 that spin about axes that extend in the direction of belt travel. The base module 513 may be similar to the S7000 belt module available from Intralox, L.L.C. of Harahan, La. The base module 513 includes hinge elements 525. The module 512 of FIGS. 15 and 16 further includes upper support rollers 571 mounted between support rails 580. The support rollers 571 are smaller in diameter than the bottom rollers 551 and are placed in select locations between adjacent bottom rollers 551. The transverse conveyor belt 540 circumnavigates the outermost bottom rollers 551o, allowing for minimal additional height, while still providing a larger radius for belt wrap. Rotation of the bottom rollers, for example, induced by a set of activation rollers, causes the transverse conveyor belt 540 to move laterally across the module. The upper support rollers 571 provide both support for the belt and apply traction between the belt and bottom rollers.

The upper rollers 571 may have grooves to seat the conveyor belt 540 and allow the top surface of the conveyor belt to be flush with the outer surfaces of the rollers providing a smooth and continuous conveying surface comprised mostly of the transverse conveyor belt 540, similar to other embodiments.

Figure 17:
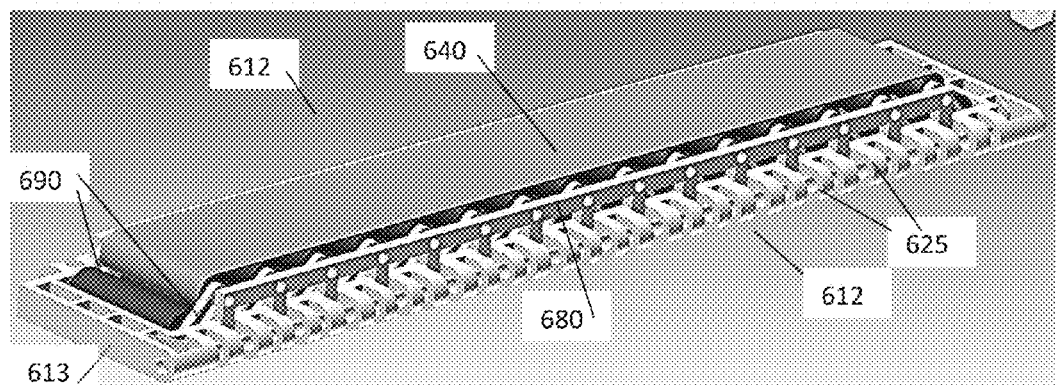
FIG. 17 is an isometric view of a conveyor belt module having a transverse conveyor belt trained over upper rollers driven by lower rollers using drive belts according to another embodiment of the invention.
Figure 18:
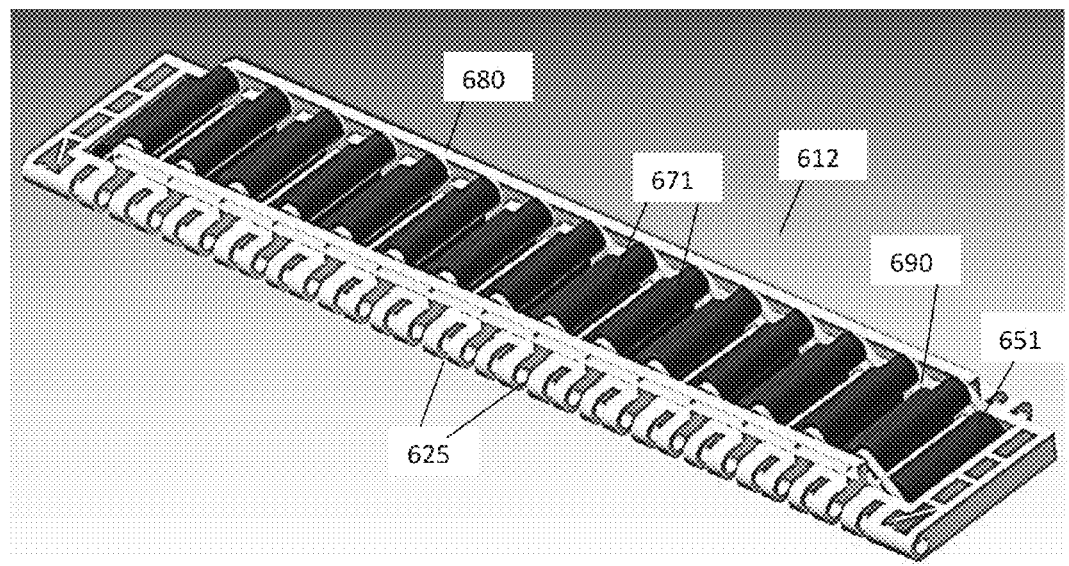
FIG. 18 shows the module of FIG. 17 with the transverse conveyor belt removed.
Figure 19:
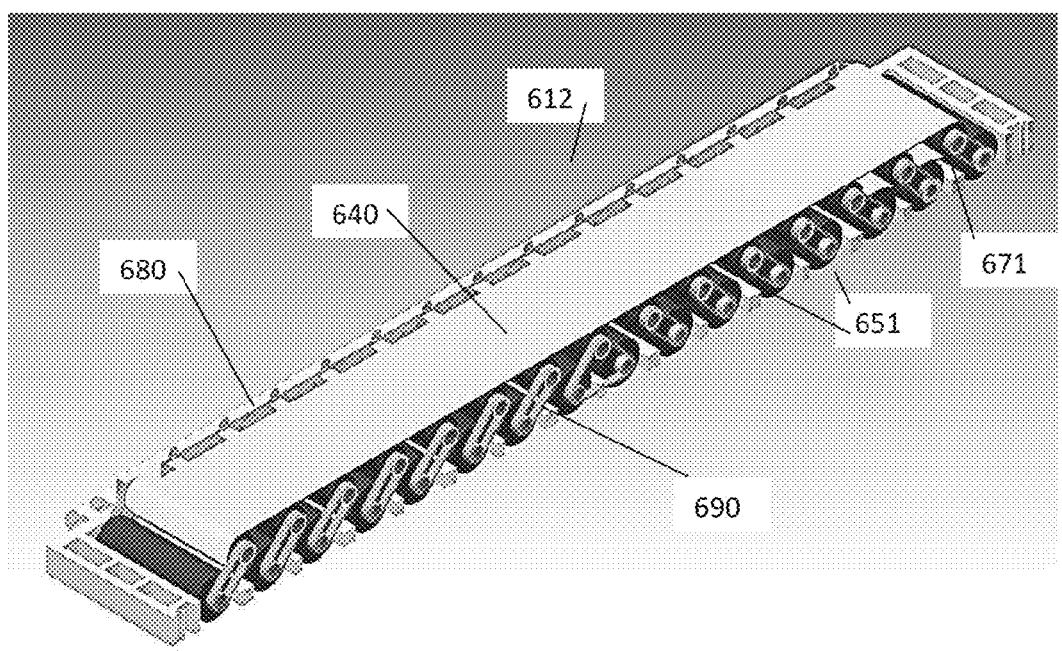
FIG. 19 is a cutaway view of the module of FIG. 17.

FIGS. 17-19 show another embodiment of a conveyor belt module 612 having a double layer of rollers and a transverse conveyor belt 640 forming a majority portion of a conveying surface. The illustrative conveyor belt module 612 includes a base module 613, which comprises a hinged module body having a series of transverse bottom rollers 651 that spin about axes that extend in the direction of belt travel. The base module 613 may be similar to the S7000 belt module available from Intralox, L.L.C. of Harahan, La. The base module 613 includes hinge elements 625. The module 612 of FIGS. 17-19 further includes upper support rollers 671 mounted between support rails 680. The transverse conveyor belt 640 is trained around the upper support rollers 671. The axles of the upper support rollers and lower support rollers are connected by drive belts 690 on one or both sides. The drive belts 690 translate rotation of the bottom rollers 651, for example, causes by moving the module over an array of activation rollers, to rotation of the upper support rollers 671, which then drives the transverse conveyor belt to one side of the module or the other, depending on the direction of rotation, which is influenced by the orientation of the activation rollers.

The upper support rollers 671 may have a groove to seat the transverse conveyor belt 640 to form an even, flush upper conveying surface.

Figure 20A:
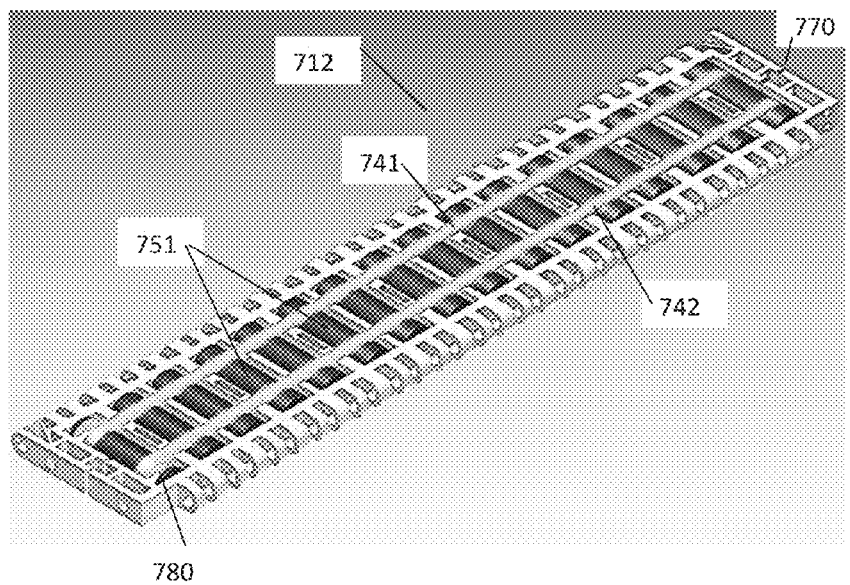
FIGS. 20A and 20B are isometric views of a roller conveyor belt module including drive belts trained over transverse rollers according to another embodiment of the invention.
Figure 20B:
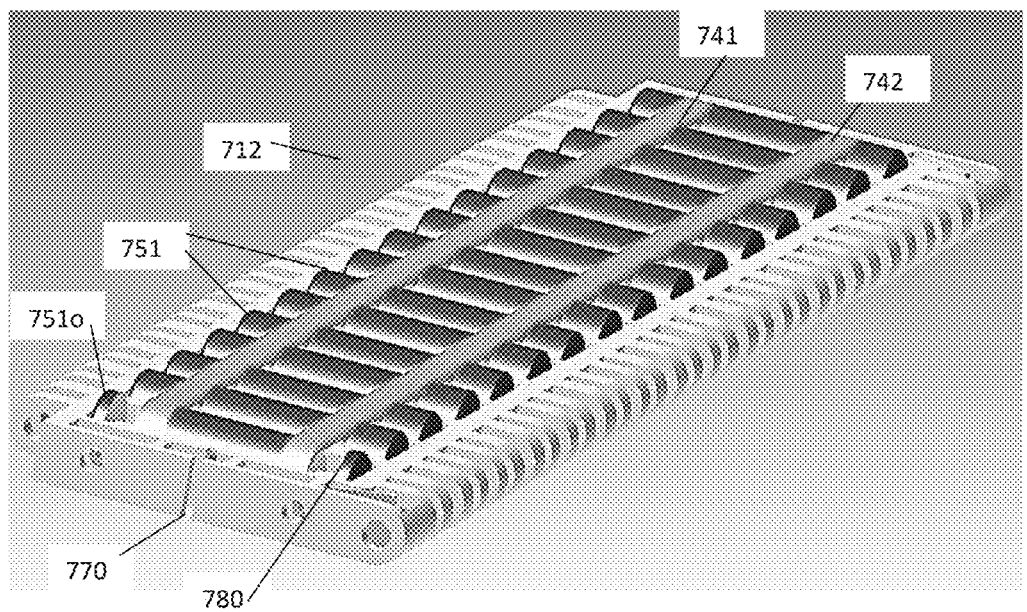
Figure 21:
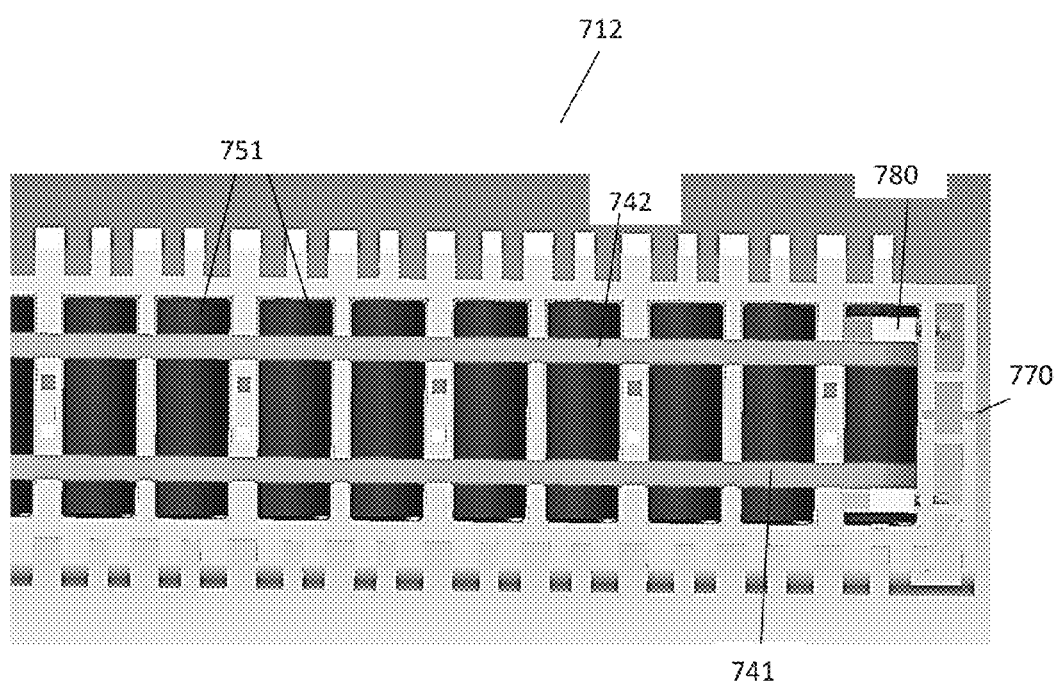
FIG. 21 is a top view of a portion of the module of FIG. 21.

FIGS. 20A, 20B and 21 illustrate an embodiment of a conveyor belt module 712 including a plurality of transverse belts 741, 742. The illustrative conveyor belt module 712 includes a base module 713, which comprises a hinged module body having a series of transverse rollers 751 that spin about axes that extend in the direction of belt travel. The base module 713 may be similar to the S7000 belt module available from Intralox, L.L.C. of Harahan, La. The base module 713 includes hinge elements 725. The transverse rollers 751 include grooves for receiving the transverse belts 741, 742, which are shown as timing belts. The transverse belts 741, 742 are trained around the outermost rollers 751o. When the rollers 751 spin, the transverse belts 741, 742 move towards one side of the module or the other.

In one embodiment, the grooves allow the timing belts to be flush with the outer surfaces of the rollers to provide a smooth conveying surface.

The module 712 further includes a tensioning device 780 for tensioning the conveyor belts 741, 742 and slots 770 in the end caps of the module to allow installation of the timing belts 741, 742.

FIGS. 22, 23, 24 and 25 show an embodiment of a tensioning device 780 for the module 712 or another module including a transverse endless belt. The tensioning device 780 includes tensioning screws 781 connected to blocks 782 mounting the axle 783 about which the outermost roller 751o rotates. The axle 783 is mounted in a tensioning allowance slot 784. Rotation of the tensioning screws 781 inserted in openings 786 of the end cap 716 in one direction pulls the axle 783 and mounted roller 751o towards the end cap 716 of the module, increasing tension in the transverse belts 741, 742. Rotation in the other direction relaxes the transverse belts 741, 742.

Figure 26A:
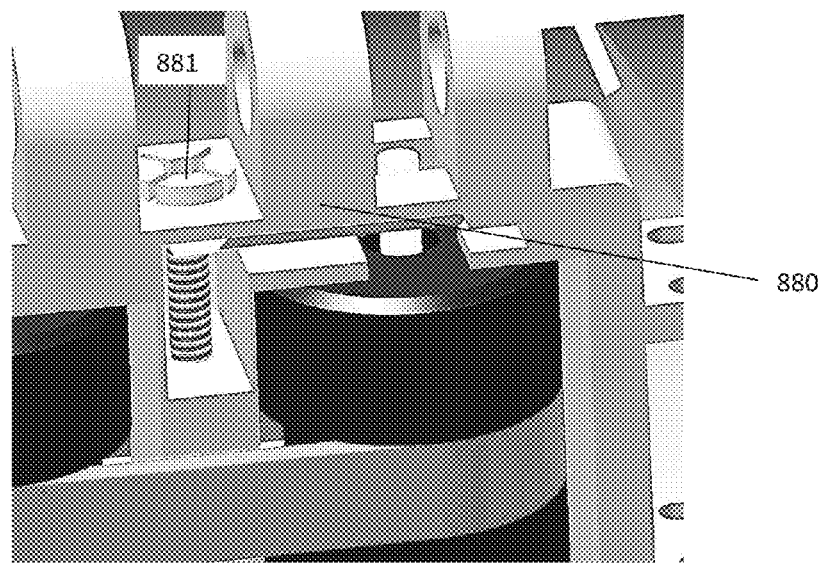
FIGS. 26A and 26B show another embodiment of a tensioning device for the module of FIGS. 20A and 20B.
Figure 26B:
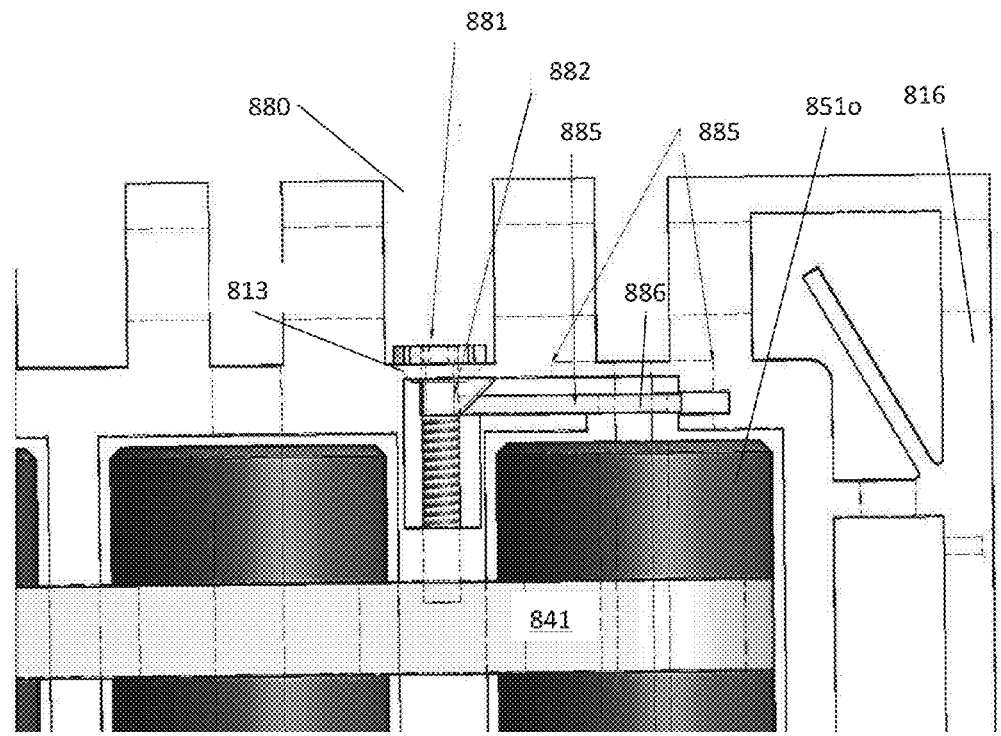
Figure 27A:
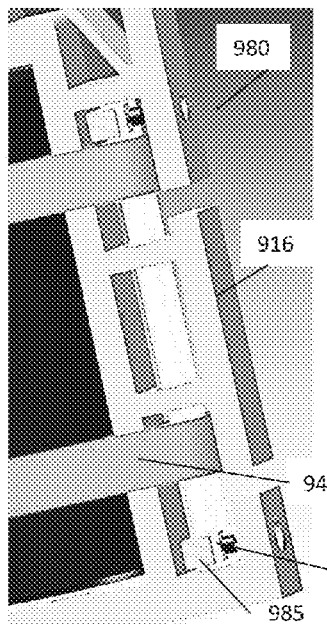
FIGS. 27A-27D show another embodiment of a tensioning device for the module of FIGS. 20A and 20B.
Figure 27B:
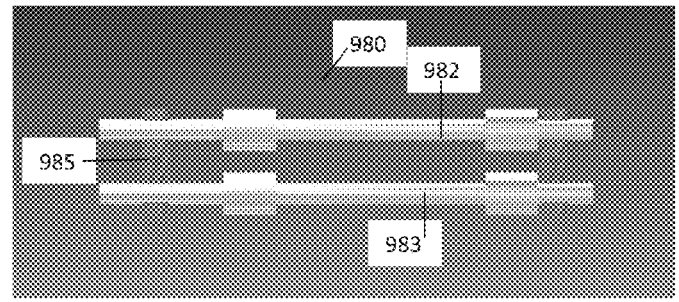
Figure 27C:
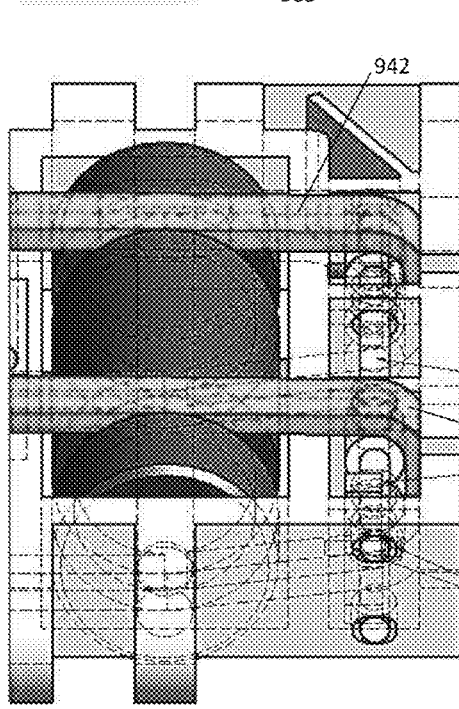
Figure 27D:
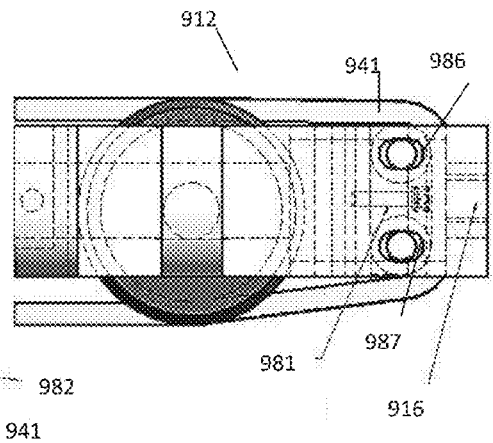

FIGS. 26A and 26B show another embodiment of a tensioning device 880 for a transverse conveyor belt on a conveyor belt module. The tensioning device 880 includes a tensioning screw 881 extending between two hinge elements 825 on a module 812. The tensioning screw 881 includes a tensioning wedge 882 opposite the module wall 813 from the screwhead. The tensioning wedge 882 is connected to a tensioning bar 884, which extends perpendicular to the screw body through a tension allowance slot 885. The tensioning bar includes an opening for mounting the axle 886 of an outermost roller 851o around which a transverse conveyor belt 841 is trained. Rotation of the tensioning screw 881 in a first direction causes the tensioning wedge 882 to push the tensioning bar 884 towards the outer edge of the module, pushing the axle 886 and associated roller 851o towards the end cap 816, causing tightening of the transverse conveyor belt 841. Rotation of the tensioning screw 881 in an opposite direction releases tension in the transverse conveyor belt 841.

FIGS. 27A-27D show another embodiment of a tensioning device for a transverse conveyor belt on a conveyor belt module. The tensioning device 980 includes tensioning rods 982, 983 in the end cap 916 of a conveyor belt module 912. Transverse conveyor belts 941, 942 wrap around the tensioning rods 982. The tension rods 982, 983 are mounted in slotted openings 986, 987 that allow movement of the tensioning rods. Tensioning screws 981 extend through the end cap 916 of the module into a tensioning block 985 connected to the tensioning rods 982, 983. Rotation of the tensioning screws 981 selectively increases and releases tension in the transverse conveyor belts 941, 942 by pulling or pushing the tensioning rods within the openings 986, 987.

Figure 28:
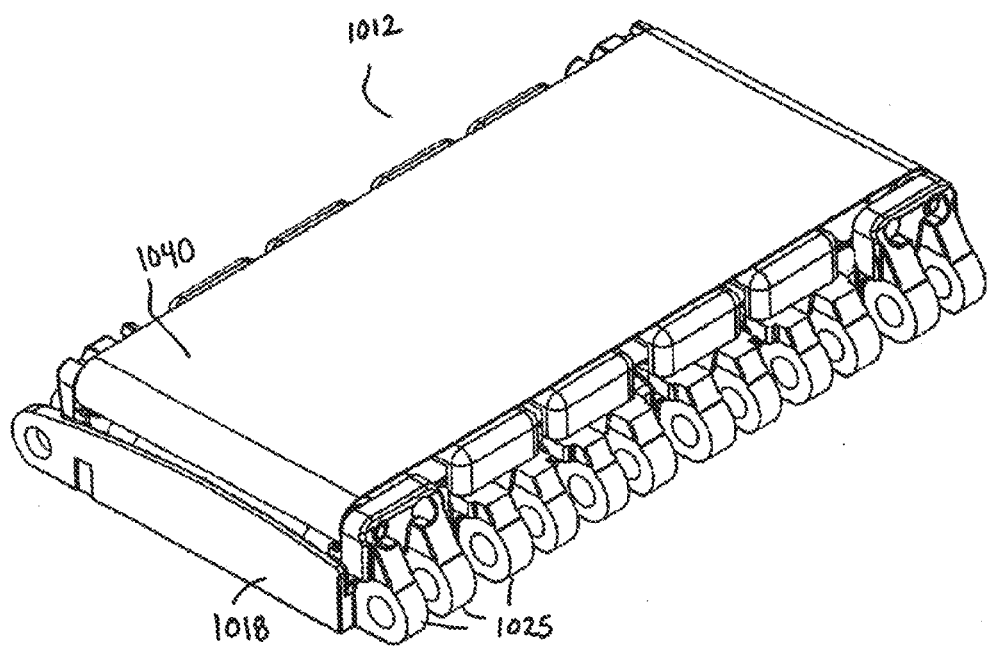
FIG. 28 is an isometric view of a conveyor belt module including a transverse conveyor belt according to another embodiment of the invention.
Figure 29:
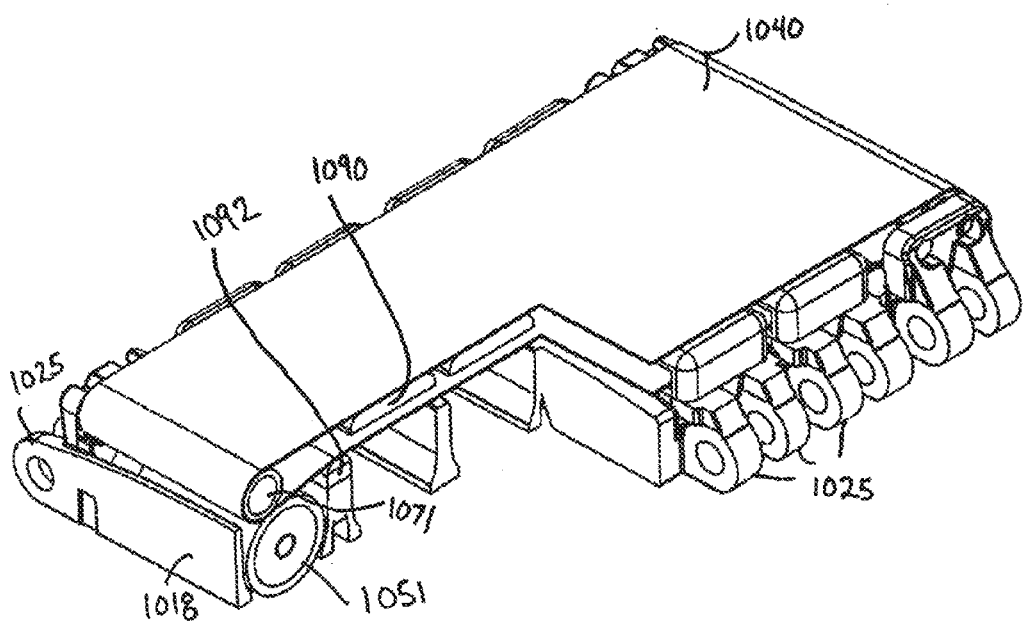
FIG. 29 is a cutaway three-quarter view of the module of FIG. 28.
Figure 30:
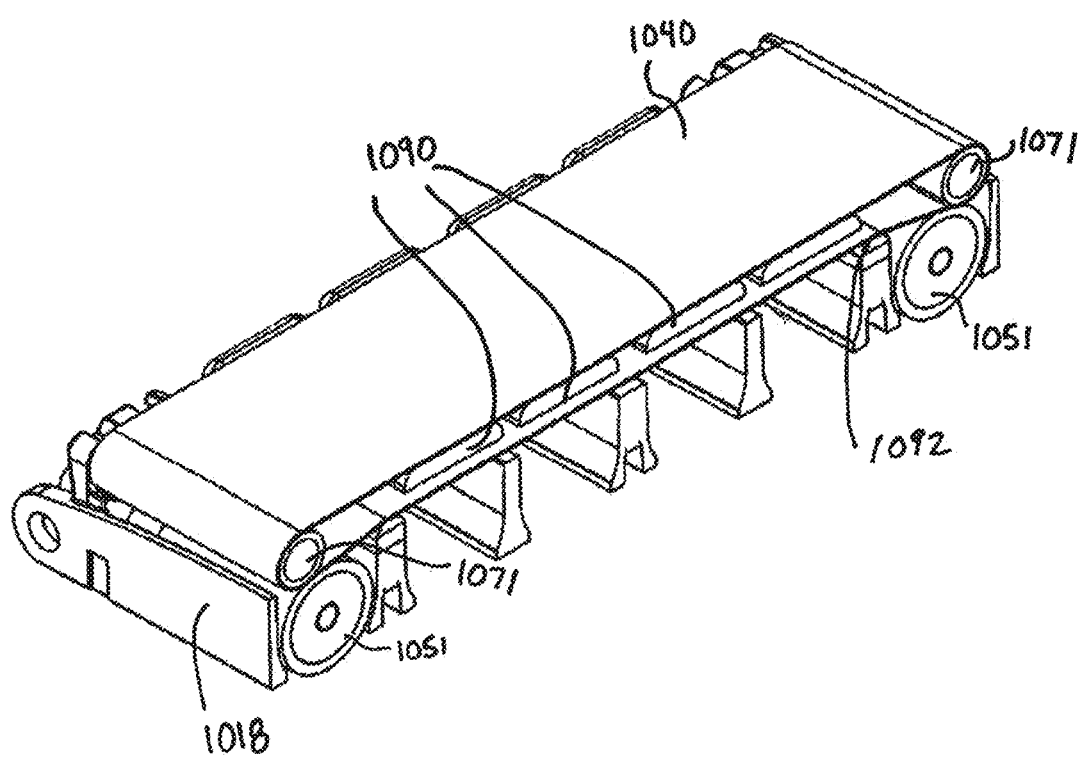
FIG. 30 is a cutaway half view of the module of FIG. 29.

FIG. 28 is an isometric view of a conveyor belt module 1012 including a transverse conveyor belt 1040 to create a transport surface transverse to the direction of belt travel. The transverse conveyor belt 1040 forms a substantial portion of the conveying surface of the module. FIG. 29 is a three-quarter section view of the belt module 1012 of FIG. 28 and FIG. 30 is a cut-away section view of the belt module 1012 of FIG. 28. The conveyor belt module 1012 includes a module body that houses transverse bottom rollers 1051. The illustrative module shows only the outermost bottom rollers, but the invention includes a series of transverse bottom rollers, similar to the S7000 belt module available from Intralox, L.L.C. of Harahan, La. The module includes hinge elements 1025 and side plates 1018 covering the outermost bottom rollers. The transverse conveyor belt 1040 is trained around upper rollers 1071 stacked about the outermost bottom rollers 1051. The illustrative upper rollers 1071 are smaller than the bottom rollers 1051. Each upper roller and lower roller creates a pinch point to guide and drive the transverse conveyor belt 1040 laterally relative to the conveyor belt module 1012. The upper span of the transverse conveyor belt is supported by support members, shown as bridges 1090, extending up and across the base of the module. The support members could comprise rollers. The lower span of the transverse conveyor belt 1040 is supported by base support members 1092.

Rotation of one or more of the bottom rollers 1051 causes counter rotation of an associated upper roller 1071 and drives the transverse conveyor belt 1040 towards one side of the module or the other. As described above, activation rollers in a carryway below the module can induce rotation of the bottom rollers 1051 to drive the transverse conveyor belt 1040.

For applications requiring high torque, the number of dual stacked rollers could be increased to improve the driving force applied to the transverse conveyor belt. For low torque applications, the number of rollers could be minimized.

The transverse conveyor belt can have any suitable type of surface, for example, to increase friction.

The use of an endless conveyor belt having a flat top that is flush or substantially flush with a conveyor belt module top surface facilitates product diversion by increasing stability and reducing noise, due to fewer moving parts and a smooth ride over an underlying carryway.

Although the invention has been described with reference to specific versions, other versions are possible. The scope of the invention is not meant to be limited to the exemplary versions described in detailed.

What is claimed is:

1. A conveyor belt module, comprising:
    a body extending in length from a forward end to a rearward end and in width from a first side edge to a second side edge and in thickness from a top side to an opposite bottom side;
    a plurality of hinge elements extending from the forward end and the rearward end;
    an endless belt arranged to move transversely relative to the body;
    a wheel rotatably mounted in a pocket in adjacent to the first side edge for guiding the endless belt between the top side and the bottom side to form a reversing end of the endless belt; and
    an end cap disposed adjacent to the first side edge for enclosing the reversing end of the endless belt.

2. The conveyor belt module of claim 1, wherein the hinge elements have a top surface that is lower than the top side of the body.

3. The conveyor belt module of claim 1, wherein the body includes a channel in the top surface for receiving the endless belt.

4. The conveyor belt module of claim 3, wherein the channel includes a plurality of rollers forming a carryway for the endless belt.

5. The conveyor belt module of claim 1, wherein the endless belt comprises a plurality of hingedly connected molded plastic modules.

6. The conveyor belt module of claim 1, wherein the end cap includes at least one hinge element configured to align with at least one of the hinge elements extending from the body.

7. The conveyor belt module of claim 1, wherein the body includes a plurality of base rollers mounted there to and forming the top side of the body.

8. The conveyor belt module of claim 7, wherein the base rollers include a groove for seating the endless belt.

9. A conveyor belt module, comprising:
    a body extending in length from a forward end to a rearward end and in width from a first side edge to a second side edge and in thickness from a top side to an opposite bottom side;
    a plurality of hinge elements extending from the forward end and the rearward end;
    a plurality of base rollers between the top side and the bottom side and a plurality of upper rollers above the base rollers;

a plurality of longitudinal bridges extending from the first end to the second end above the top surface; and an endless conveyor belt trained about the upper rollers and arranged to move transversely relative to the body, wherein the longitudinal bridges support the top span of the endless conveyor belt.

10. A conveyor belt module comprising:

an upper surface having a groove;

a transverse endless conveyor belt seated in the groove and flush with the upper surface in an upper span to form a conveying surface that comprises both the upper surface and the upper span of the transverse endless conveyor belt;

a first set of hinge elements extending along a front end of the module; and a second set of hinge elements extending along a rear end of the module, wherein the groove extends from the first set of hinge elements to the second set of hinge elements, so that the transverse endless belt forms a majority of the conveying surface of the module.

11. The conveyor belt module of claim 10, wherein the upper surface comprises a plurality of rollers.

12. The conveyor belt module of claim 11, further comprising transverse rails for mounting the rollers, the transverse rails receiving the axles of the rollers.

13. The conveyor belt module of claim 10, further comprising a plurality of rollers in the groove forming a carryway for the transverse endless conveyor belt.

\* \* \* \* \*